US008801195B2

(12) United States Patent
Mochizuki et al.

(10) Patent No.: US 8,801,195 B2
(45) Date of Patent: Aug. 12, 2014

(54) PROJECTOR HAVING A LIGHT SHIELD UNIT WITH A COUNTOURED LEADING EDGE

(75) Inventors: Hirotaka Mochizuki, Matsumoto (JP); Kanji Yoshida, Azumino (JP)

(73) Assignee: Seiko Epson Corporation, Tokyo (JP)

(*) Notice: Subject to any disclaimer, the term of this patent is extended or adjusted under 35 U.S.C. 154(b) by 541 days.

(21) Appl. No.: 12/910,984

(22) Filed: Oct. 25, 2010

(65) Prior Publication Data

US 2011/0096302 A1    Apr. 28, 2011

(30) Foreign Application Priority Data

Oct. 27, 2009  (JP) .................................. 2009-246213
Dec. 28, 2009  (JP) .................................. 2009-297043

(51) Int. Cl.
| G03B 21/14 | (2006.01) |
| G02B 27/14 | (2006.01) |
| G02B 27/09 | (2006.01) |
| H04N 9/31 | (2006.01) |
| G02B 5/00 | (2006.01) |
| G02B 27/10 | (2006.01) |

(52) U.S. Cl.
CPC .............. G03B 21/14 (2013.01); G02B 27/149 (2013.01); G02B 27/0988 (2013.01); H04N 9/3197 (2013.01); H04N 9/3152 (2013.01); G02B 5/003 (2013.01); G02B 27/145 (2013.01); G02B 27/1046 (2013.01)
USPC ......................................................... 353/88

(58) Field of Classification Search
CPC ......... G03B 9/04; G03B 9/06; G03B 21/2053
USPC ......... 353/75, 88, 97; 348/740; 359/231, 232, 359/233, 234, 236
See application file for complete search history.

(56) References Cited

U.S. PATENT DOCUMENTS

| 8,052,285 B2 | 11/2011 | Yamada et al. | |
| 2008/0304022 A1* | 12/2008 | Yamada et al. | .................. 353/97 |
| 2009/0225389 A1* | 9/2009 | Nakano | ......................... 359/236 |

FOREIGN PATENT DOCUMENTS

| CN | 101320201 A | 12/2008 |
| JP | 2004-069966 A | 3/2004 |
| JP | 2005-017501 A | 1/2005 |
| JP | 2005-031103 A | 2/2005 |
| JP | 2007-071913 A | 3/2007 |
| JP | 2010-048913 A | 3/2010 |

* cited by examiner

*Primary Examiner* — Thanh Luu
*Assistant Examiner* — Danell L Owens
(74) *Attorney, Agent, or Firm* — ALG Intellectual Property, LLC

(57) ABSTRACT

In at least one embodiment of the disclosure, a projector includes a light shield unit that shields a portion of a light emitted from a light source. The light shield unit is driven by a drive mechanism and rotates around a predetermined rotation axis to change a size of a light shield area. The light shield unit includes a leading edge having a contour defined by a plurality of first edges and a second edge disposed between the first edges. The second edge configured so as to be shifted toward the light source and away from the first edges during rotation of the light shield unit.

11 Claims, 11 Drawing Sheets

PROJECTOR HAVING A LIGHT SHIELD UNIT WITH A COUNTOURED LEADING EDGE

CROSS-REFERENCE

The present application claims priority from Japanese Patent Application No. 2009-246213 filed on Oct. 27, 2009 and Japanese Patent Application No. 2009-297043 filed on Dec. 28, 2009, each of which is hereby incorporated by reference in its entirety.

BACKGROUND

A known projector which controls an associated illumination device by using a light shield unit has a pair of light shield members rotated to open and close, for example, as components disposed in such a position as to be symmetric with each other with an illumination optical axis interposed therebetween, and positioned between a pair of lens arrays within the illumination device so as to control the shield amount of illumination light by using the light shield members (for example, see JP-A-2007-71913 and JP-A-2004-69966). According to a known structure, the light shield members are constituted by block-shaped light shield bodies which have notch-shaped recesses to control the change of the light shield amount (see JP-A-2005-17501).

However, when the light shield is achieved by the opening and closing operation of the plate-shaped light shield members (light shield plates) as disclosed in JP-A-2007-71913 and JP-A-2004-69966, for example, there is a possibility that the change of the light shield amount does not become smooth. Moreover, when the block-shaped light shield bodies having the notch-shaped recesses are used as the light shield members as proposed in JP-A-2005-17501, the light shield bodies need complicated curved surfaces to produce a desirable change of the light shield amount in some cases, which may increase the space occupied by the light shield bodies.

SUMMARY

In accordance with certain embodiments of the disclosure it is possible to provide a projector having a simplified and space-saving structure, and capable of producing a relatively smooth change of the light shield amount and sufficiently lowering the illumination light amount under the maximum light shield condition.

A projector according to a first aspect of the disclosure includes an illumination system having a light source, a light shield unit which shields a part of light emitted from the light source, and a drive mechanism which drives the light shield unit; and a light modulation device illuminated by illumination light received from the illumination system. According to this projector, the light shield unit driven by the drive mechanism rotates around a predetermined rotation axis to change the size of a light shield area. The light shield unit has a leading edge corresponding to the boundary between the light shield area and a non light shield area during the rotation. The leading edge has a first area and a second area located at a position shifted toward the light source from the first area during rotation of the light shield unit. The first area is separated into a plurality of portions on the leading edge. The second area is disposed between the portions of the first area. The leading edge has the first and second areas within the effective range of the optical path of the illumination light. The presence or absence of these areas is not referred to in the area out of the effective range of the optical path of the illumination light.

According to this projector, the second area disposed between the separated portions of the first area on the leading edge of the light shield unit is located at the position shifted toward the light source from the first area during rotation of the light shield unit. Thus, the contour of the leading edge, i.e., the edge shape of the opening as viewed from the light entrance side can be changed in accordance with the rotation of the light shield unit. As such, the change of the light shield amount produced by the opening and closing operation can be made relatively smooth, and the illumination light amount can be sufficiently lowered under the maximum light shield condition by controlling the positional relationship between the first area and the second area on the leading edge. For example, the second area may be disposed in the central area of the leading edge relatively close to an system optical axis, and the first area may be disposed on the peripheral area relatively away from the system optical axis. In this case, the change of the light shield amount can be controlled in the central area receiving relatively large amount of light.

In a specific aspect or example of the disclosure, the difference between the maximum distance from the first area to a reference plane containing the center axis of the light emitted from the light source and extending in parallel with the rotation axis and the maximum distance from the second area to the reference plane gradually decreases as the light shield area gradually increases by the rotation of the light shield unit. As such, the difference between the areas increases when the light shield area is small, and the difference between the areas decreases when the light shield area is large. Thus, the light shield unit, i.e., the edge shape of the opening can be produced in accordance with the light shield amount.

In another aspect of the disclosure, the shape of the leading edge as viewed in the direction of the center axis of the light becomes linear when the light shield unit lies in the maximum light shield condition. As such, the light shield amount under the maximum light shield condition can be sufficiently increased similarly to a structure which includes a flat-plate-shaped light shield component.

In another aspect of the disclosure, the light shield unit has a concave portion concaved in the direction of opening the light shield unit, and has the second area corresponding to the edge of the concave portion. As such, the concave portion becomes an area through which light is allowed to pass for preference in accordance with the opening of the light shield unit.

In another aspect of the disclosure, the light shield unit has flat portions disposed on both sides of the concave portion and extending in a direction away from the concave portion, and has the first area corresponding to the edges of the flat portions. As such, the amount of light shield affected by the rotation operation can be controlled by utilizing the difference between the concave portion which changes light shield and the flat portions which achieve ordinary light shield.

In another aspect of the disclosure, the light shield unit has an end portion containing the leading edge and a main portion continuing to the end portion. The end portion is a bended portion of the main portion. The end portion has a notch corresponding to the second area. As such, the contour of the notch provided on the end portion formed by bending the main portion as viewed from the light entrance side changes in accordance with the rotation of the light shield unit to produce an area through which light is allowed to pass for preference by using the notch.

In another aspect of the disclosure, the light shield unit is formed by a continuous single material. As such, the light shield unit has a simplified structure and thus can be easily assembled only requiring relatively small space. The single material herein may have a uniform thickness. The uniform thickness includes not only a completely constant thickness but also a substantially uniform thickness having a slight difference.

In another aspect of the disclosure, the light shield unit is formed by press working of a single plate-shaped material. As such, the light shield unit can be manufactured relatively easily, and the number of parts included in the projector can be reduced.

In another aspect of the disclosure, a pair of the light shield units are disposed symmetric with respect to a reference plane containing the center axis of the light and extending in parallel with the rotation axis with the reference plane interposed between the light shield units. The drive mechanism drives the pair of the light shield units in synchronization with each other. As such, the light shield amount can be increased or decreased while maintaining the symmetry with respect to the system optical axis.

In another aspect of the disclosure, the illumination system has a pair of lens arrays which equalize the light emitted from the light source. The light shield unit is disposed between the pair of the lens arrays. As such, the space for the rotation of the light shield unit can be secured, and the effect of the light amount control produced by the light shield unit on the uniformity of illumination can be reduced.

A projector according to another aspect of the disclosure includes an illumination system having a light source, a light shield unit which shields a part of light emitted from the light source, and a drive mechanism which drives the light shield unit, and a light modulation device illuminated by illumination light received from the illumination system. As such, the light shield unit driven by the drive mechanism rotates around a predetermined rotation axis to change the size of a light shield area, and the shape of the leading edge of the light shield unit close to a system optical axis becomes a shape concaved and convexed in the direction of the system optical axis when the light shield unit lies in the maximum light shield condition. The leading edge has the concaved and convexed shape within the effective range of the optical path of the illumination light. The presence or absence of the concave and convex is not referred to in the area out of the effective range of the optical path of the illumination light.

According to this embodiment, the leading edge of the light shield unit linearly extends while exhibiting the concaved and convexed shape in the direction of the system optical axis under the maximum light shield condition for shielding the largest possible amount of illumination light. Thus, the contour of the leading edge of the light shield unit as viewed from the light entrance side, i.e., in the direction of the system optical axis changes in accordance with the rotation of the light shield unit and in correspondence with the concave and convex condition (such as the range and depth of the concave and convex shape). Thus, the change of the light shield amount by the opening and closing operation can be made smooth, and the illumination light amount can be sufficiently lowered under the maximum light shield condition by controlling the concave and convex condition of the leading edge.

A projector according to another aspect of the disclosure includes an illumination system having a light source, a light shield unit which shields a part of light emitted from the light source, and a drive mechanism which drives the light shield unit; and a light modulation device illuminated by illumination light received from the illumination system. According to this projector, the light shield unit has a first light shield section driven by the drive mechanism to rotate around a predetermined first rotation axis, and a second light shield section rotated around a second rotation axis different from the first rotation axis. The first light shield section has a first leading edge containing a first part and a second part as the boundary between a light shield area and a non light shield area during the rotation. The second light shield section has a second leading edge containing a third part opposed to the first part and a fourth part opposed to the second part as the boundary between the light shield area and the non light shield area during the rotation. When the shape of the first leading edge and the shape of the second leading edge are projected in the center axis direction of the illumination light, a first distance between the projected first part and third part is shorter than a second distance between the projected second part and fourth part, and the difference between the first distance and the second distance varies in accordance with the rotations of the first light shield section and the second light shield section. The first leading edge has the first part and the second part, and the second leading edge has the third part and the fourth part within the effective range of the optical path of the illumination light.

According to this embodiment, the difference between the first distance from the first part to the third part and the second distance from the second part to the fourth part changes in accordance with the rotations of the first light shield section and the second light shield section. In this case, the change of the light shield amount effected by the opening and closing operation can be made relatively smooth, and the illumination light amount can be sufficiently lowered under the maximum light shield condition by controlling the degree of change of the difference between the first distance and the second distance utilizing the positional relationship and the like of the respective components of the first and second light shield sections.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

First Embodiment

A projector according to a first embodiment of the disclosure is hereinafter described with reference to FIG. 1 and other figures.

1. Outline of Structure of Projector

Figure 1:
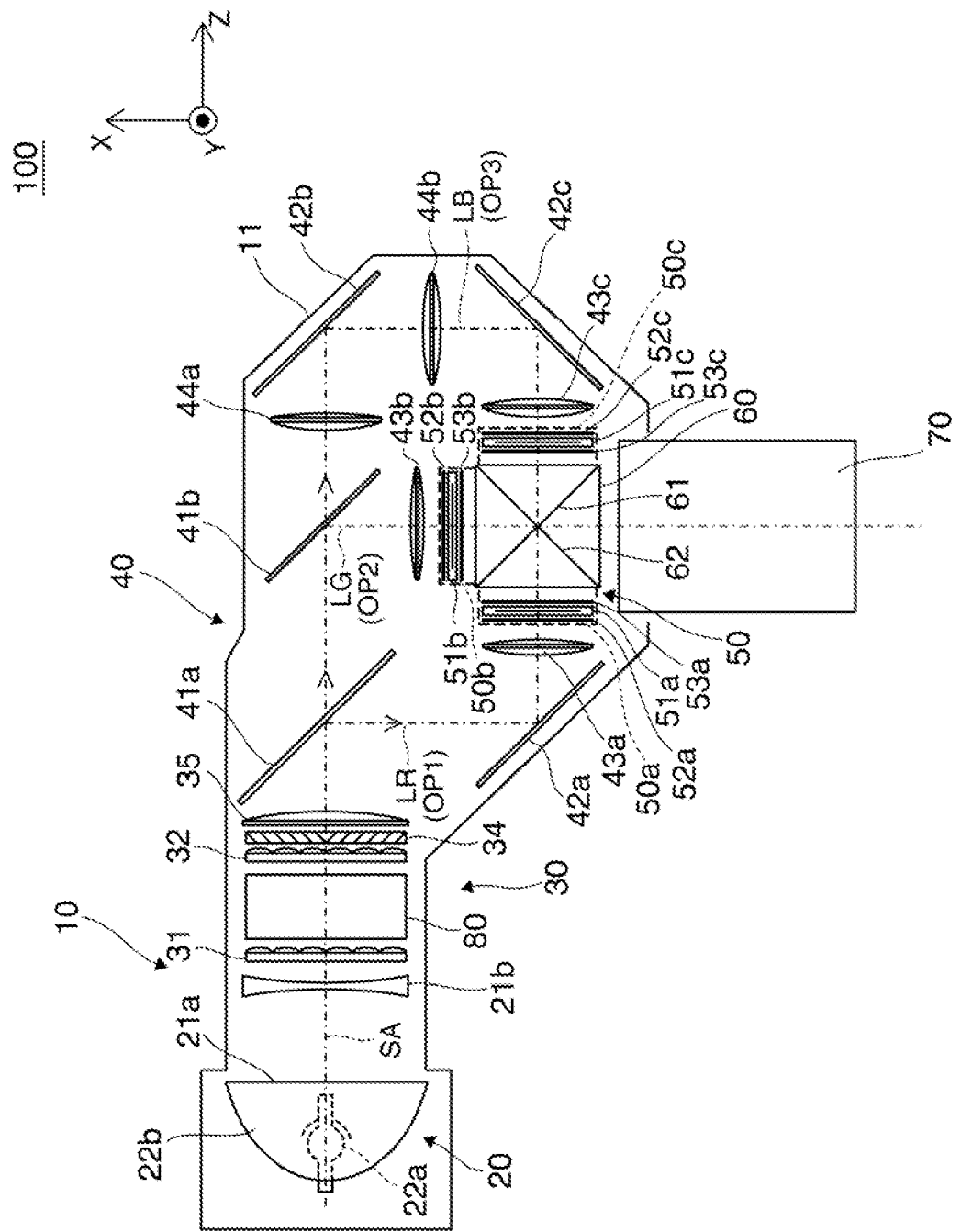
FIG. 1 is a plan view schematically illustrating the concept of a projector according to a first embodiment.

As illustrated in FIG. 1, a projector 100 in this embodiment includes an illumination device 10, a color separation and light guide system 40, a light modulation unit 50, a cross dichroic prism 60, and a projection system 70. The illumination device 10 is an illumination system containing a light source lamp unit 20, an equalizing system 30, and a light control device 80.

Almost the entire parts of the optical units included in the projector 100, that is, the illumination device 10, the color separation and light guide system 40, the light modulation unit 50, the cross dichroic prism 60, and the projection system 70 are accommodated in a case member 11 as a light guide having light shield capability. These optical units or their constituent elements are aligned and assembled on a holding unit (not shown) provided on the inner surface or the like of the case member 11.

The light source lamp unit 20 of the illumination device 10 has a lamp unit 21a and a concave lens 21b as a light source. The lamp unit 21a has an arc tube 22a constituted by a high-pressure mercury lamp or the like, and an ellipsoidal concave mirror 22b for reflecting light emitted from the arc tube 22a toward the front. The concave lens 21b has a function of converting the light received from the lamp unit 21a into light substantially parallel with a system optical axis SA, i.e., the illumination optical axis. However, when the concave mirror 22b is a parabolic mirror, the concave lens 21b can be eliminated. The system optical axis SA is an axis passing through almost the center of the optical path within the optical unit.

The equalizing system 30 has first and second lens arrays 31 and 32, a polarization converting member 34, and a stacking lens 35. Each of the first and second lens arrays 31 and 32 is a fly-eye lens having a plurality of element lenses disposed in matrix in X and Y directions, for example. The light from the light source lamp unit 20 is divided into plural partial lights by the element lenses included in the first lens array 31. The respective partial lights from the first lens array 31 are released through the element lenses included in the second lens array 32 at appropriate divergence angles. The polarization converting member 34 is constituted by a prism array made of PBS, for example, and has a function of converting the lights received from the lens array 32 into only linear polarized lights in a particular direction and supplying the converted lights to the subsequent optical system. The stacking lens 35 converges the whole illumination light released from the second lens array 32 and converted by the polarization converting member 34 to stack the illumination light on liquid crystal light valves 50a, 50b, and 50c for respective colors provided on the light modulation unit 50.

The light control device 80 is disposed between the first lens array 31 and the second lens array 32, for example, and opens and closes a pair of light shield members 91a and 91b (see FIG. 2 and other figures) outwardly in the Y direction to control the amount of illumination light emitted from the illumination device 10. The specific structure of the light control device 80 will be described later with reference to FIG. 2 and other figures.

The color separation and light guide system 40 has first and second dichroic mirrors 41a and 41b, reflection mirrors 42a, 42b, and 42c, and three field lenses 43a, 43b, and 43c. The color separation and light guide system 40 separates the illumination light emitted from the light source lamp unit 20 into three color lights in red (R), green (G), and blue (B), and guides the respective color lights toward the corresponding liquid crystal light valves 50a, 50b, and 50c. More specifically, the first dichroic mirror 41a reflects an illumination light LR in R color contained in the three color lights in R, G, and B colors and transmits illumination lights LG and LB in G and B colors. The second dichroic mirror 41b reflects the illumination light LG contained in the two color lights in G and B colors and transmits the illumination light LB in B color. Thus, the red light LR reflected by the first dichroic mirror 41a is guided to a first optical path OP1 provided with a field lens 43a, the green light LG transmitted by the first dichroic mirror 41a and reflected by the second dichroic mirror 41b is guided to a second optical path OP2 provided with a field lens 43b, and the blue light LB transmitted by the second dichroic mirror 41b is guided to a third optical path OP3 provided with a field lens 43c. The field lenses 43a, 43b, and 43c for the respective colors control the partial lights received from the second lens array 32 through the stacking lens 35 and to be supplied to the light modulation unit 50 such that the incident angles of the partial lights have appropriate convergence or divergence for the system optical axis SA on light receiving areas of the liquid crystal light valves 50a, 50b, and 50c. A pair of relay lenses 44a and 44b disposed on the third optical path OP3 relatively longer than each of the first optical path OP1 and the second optical path OP2 transmit an image formed immediately before the light entrance side of the first relay lens 44a to the light exit side of the field lens 43c substantially without change to prevent lowering of the use efficiency of light caused by diffusion of light or for other reasons.

The light modulation unit 50 has the three liquid crystal light valves 50a, 50b, and 50c for receiving the three color illumination lights LR, LG, and LB, respectively. The liquid crystal light valves 50a, 50b, and 50c have liquid crystal panels 51a, 51b, and 51c disposed at the centers, entrance side polarization filters 52a, 52b, and 52c on the optical path upstream side, and exit side polarization filters 53a, 53b, and 53c on the optical path downstream side, with the liquid crystal panels 51a, 51b, and 51c sandwiched between the corresponding entrance side polarization filters 52a, 52b, and 52c and exit side polarization filters 53a, 53b, and 53c. The intensities of the respective color lights LR, LG and LB having entered the liquid crystal light valves 50a, 50b, and 50c are modulated by pixel according to drive signals or control signals inputted to the liquid crystal light valves 50a, 50b, and 50c as electric signals.

The cross dichroic prism 60 is a light combining system for combining lights into a color image. The cross dichroic prism 60 contains a first dichroic film 61 for reflecting R light, and a second dichroic film 62 for reflecting B light disposed in an X shape in the plan view. The cross dichroic prism 60 reflects the red light LR received from the liquid crystal light valve 50a such that the red light LR can be released toward the right with respect to the traveling direction by using the first dichroic film 61, directs the green light LG received from the liquid crystal light valve 50b such that the green light LG can be released in the straight direction by using both the dichroic films 61 and 62, and reflects the blue light LB received from the liquid crystal light valve 50c such that the blue light LB can be released toward the left with respect to the traveling direction by using the second dichroic film 62.

The projection system 70 as a projection lens projects the image light produced by the cross dichroic prism 60 on a screen (not shown) as a color image.

According to the projector 100 having this structure, the illumination device 10 shields a part of light by using the light control device 80 included in the illumination device 10 to control the amount of illumination light. That is, the projector 100 changes the amount of illumination light by opening and closing the light control device 80, and obtains high dynamic contrast by controlling the amount of illumination light according to scenes to be displayed, for example. Moreover, the projector 100 uses the light control device 80 producing a smooth curve of light reduction as will be described later, and thus it is possible to form a high-quality image by the light control having a preferable response.

2. Description of Structure and Others of Light Control Device

Figure 2:
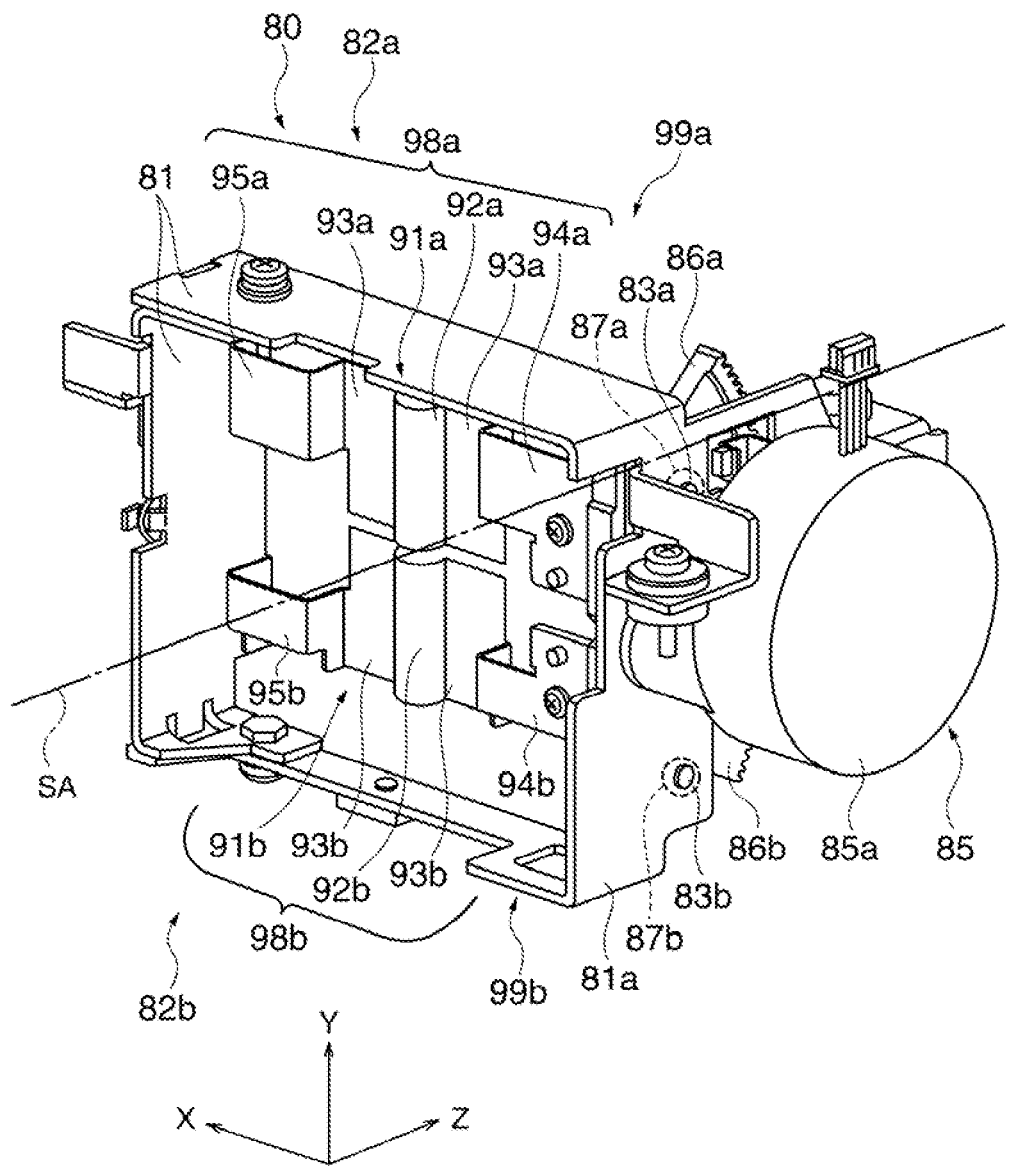
FIG. 2 is a perspective view illustrating the structure of a light control device as viewed in one direction.
Figure 3:
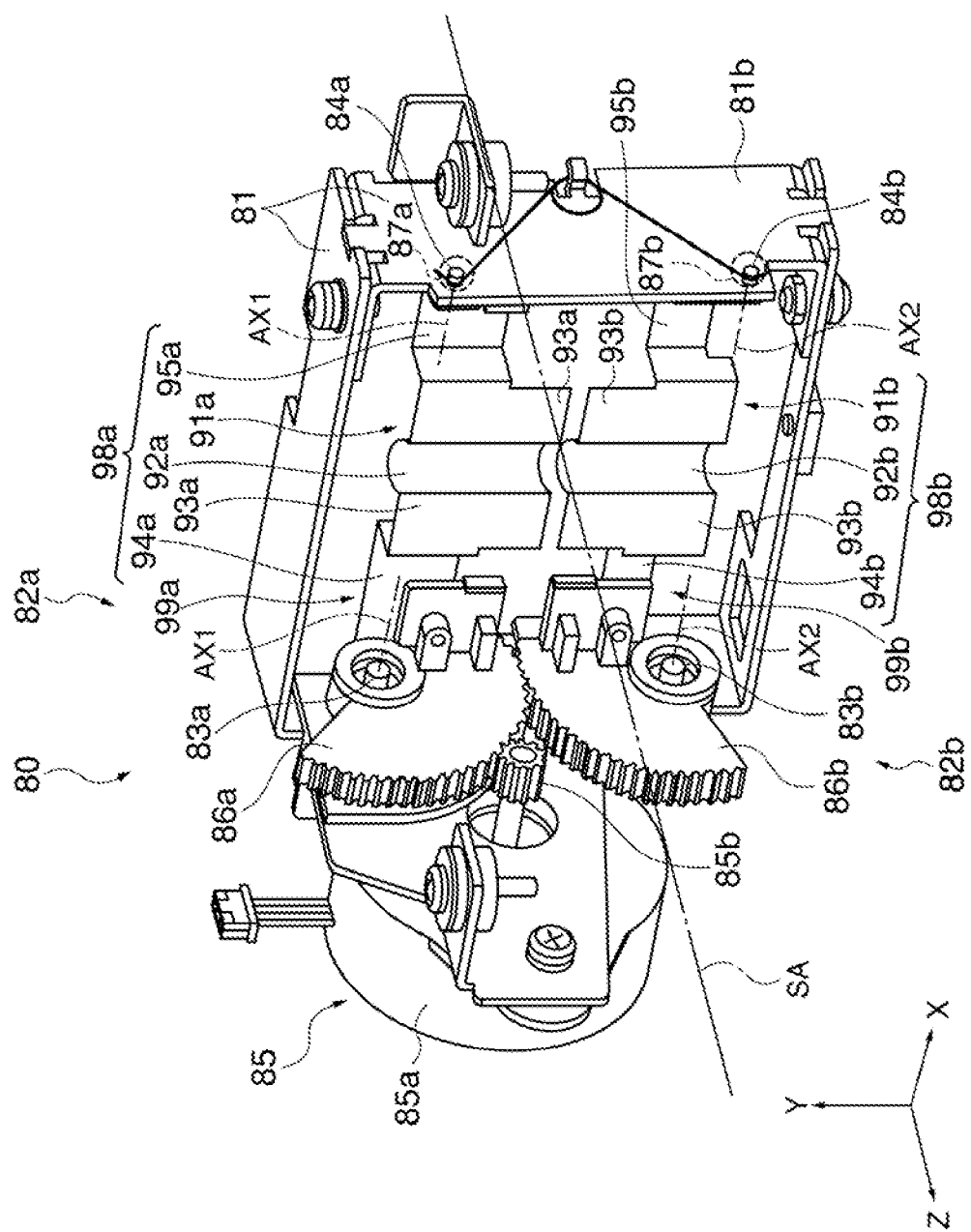
FIG. 3 is a perspective view illustrating the structure of the light control device as viewed in another direction.

FIGS. 2 and 3 are perspective views illustrating the structure of the light control device 80. FIG. 2 shows the light control device 80 as viewed from the optical path upstream side, while FIG. 3 shows the light control device 80 as viewed from the optical path downstream side. The light control device 80 has a fixed member 81, a pair of light shield units 82a and 82b, and a drive mechanism 85. The first light shield unit 82a is disposed on the +Y side of the system optical axis SA, while the second light shield unit 82b is disposed on the −Y side of the system optical axis SA. Both FIG. 2 and FIG. 3 show the light control device 80 under the full-close condition of the light shield units 82a and 82b for shielding the maximum amount of illumination light (maximum light shield condition). The light shield units 82a and 82b and the like are supported on or fixed to the fixed member 81. The fixed member 81 is assembled on the case member 11 (see FIG. 1) as the light guide.

The first light shield unit 82a has a first opening and closing member 98a, and a first attachment unit 99a for allowing attachment of the opening and closing member 98a to the fixed member 81. The second light shield unit 82b has a second opening and closing member 98b, and a second attachment unit 99b for allowing attachment of the opening and closing member 98b to the fixed member 81.

The first opening and closing member 98a is disposed on the upper half side (+Y side of the system optical axis SA) in FIG. 2 and other figures, and has a first light shield member 91a and a pair of support members 94a and 95a. The first light shield member 91a is a rectangular plate-shaped member formed three-dimensionally, and performs opening and closing operation to enter into or withdraw from the effective range of the optical path of the illumination light passing through the light control device 80. The support members 94a and 95a extending from both ends of the first light shield member 91a in the ±X direction on the root side are used to support the first light shield member 91a such that the first light shield member 91a can rotate around a center axis AX1 as a first rotation axis extending in the X direction.

The first attachment unit 99a associated with the first opening and closing member 98a has a drive gear 86a fixed to the support member 94a to receive operation from the drive mechanism 85, and pin-shaped rotational support shafts 83a and 84a for supporting the support members 94a and 95a.

The second opening and closing member 98b is disposed on the lower half side (−Y side of the system optical axis SA) in FIG. 2 and other figures, and has a second light shield member 91b and a pair of support members 94b and 95b. The second light shield member 91b is a rectangular plate-shaped member formed three-dimensionally, and performs opening and closing operation to enter into or withdraw from the effective range of the optical path of the illumination light passing through the light control device 80. The support members 94b and 95b extending from both ends of the second light shield member 91b in the ±X direction on the root side are used to support the second light shield member 91b such that the second light shield member 91b can rotate around a center axis AX2 as a second rotation axis extending in the X direction.

The second attachment unit 99b associated with the second opening and closing member 98b has a drive gear 86b fixed to the support member 94b to receive operation from the drive mechanism 85, and pin-shaped rotational support shafts 83b and 84b for supporting the support members 94b and 95b. The drive gear 86a of the attachment unit 99a and the drive gear 86b of the attachment unit 99b engage with each other and rotate in synchronization with each other in the opposite directions.

The support members 94a and 94b extending on the −X side of the pair of the light shield units 82a and 82b are rotatably supported by bearings 87a and 87b provided on a side wall 81a of the fixed member 81 positioned on the −X side via the rotational support shafts 83a and 83b. The support members 95a and 95b extending on the +X side of the pair of the light shield units 82a and 82b are rotatably supported by the bearings 87a and 87b provided on a side wall 81b of the fixed member 81 positioned on the +X side via the rotational support shafts 84a and 84b. In this structure, the pair of the light shield units 82a and 82b driven by the drive mechanism 85 are opened and closed in synchronization with each other while supported by the fixed member 81 to shield the illumination light emitted from the illumination device 10 in an appropriate manner for the control of the illumination light amount.

Figure 4:
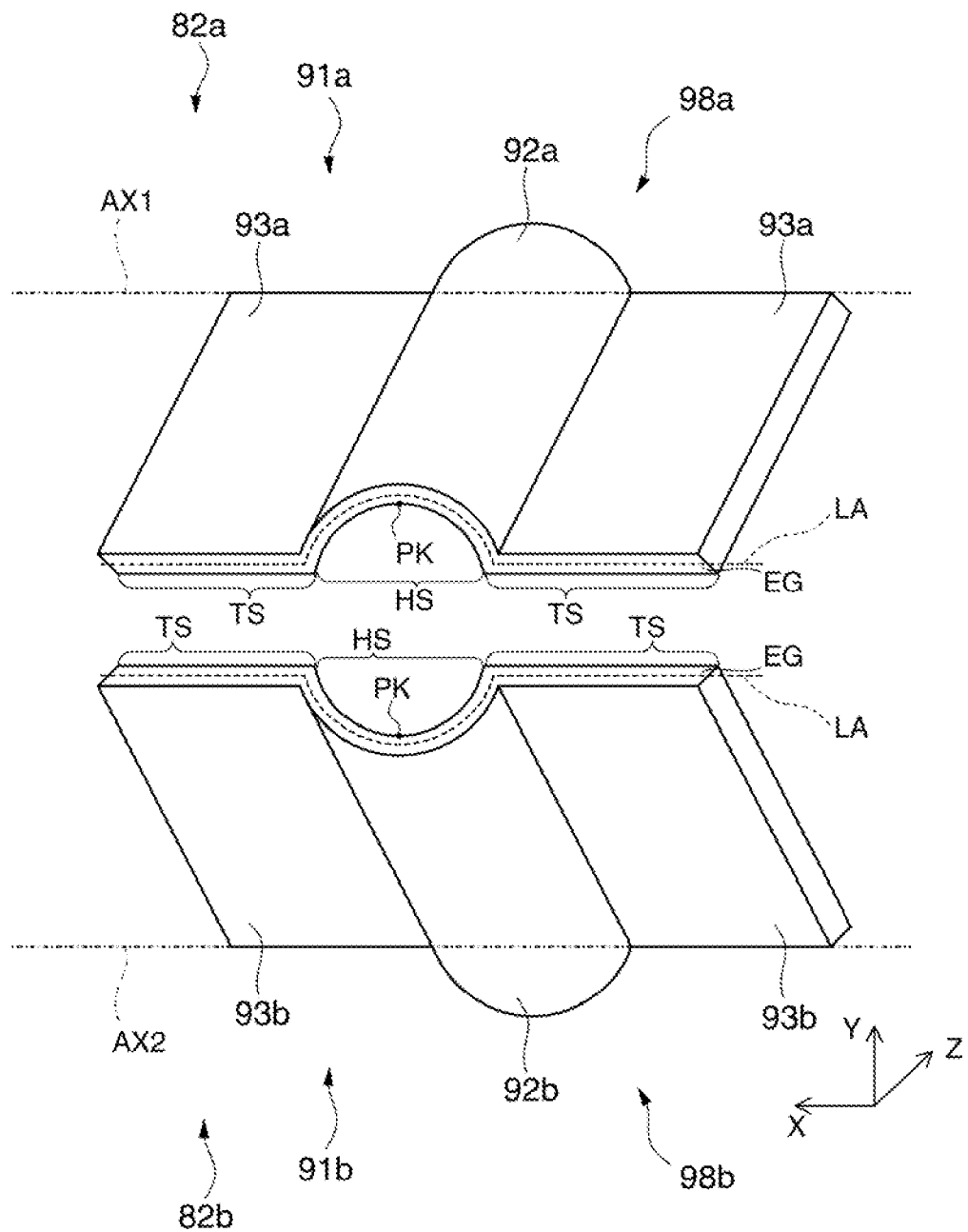
FIG. 4 is a perspective view schematically illustrating the structure of light shield members.
Figure 5:
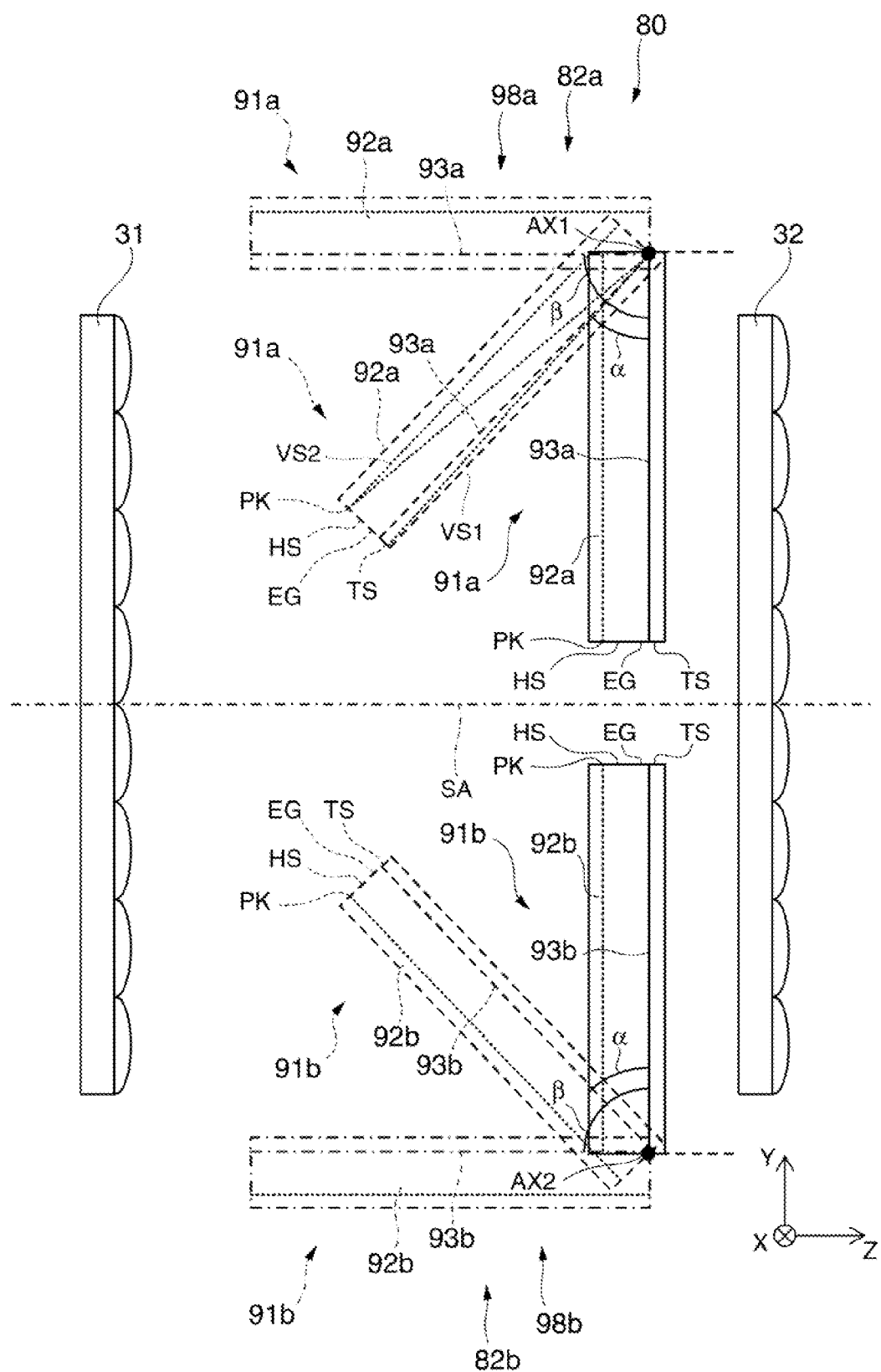
FIG. 5 illustrates opening and closing operation of the light shield members included in the projector.

FIG. 4 schematically illustrates the pair of the light shield members 91a and 91b as the main parts included in the constituent elements of the pair of the light shield units 82a and 82b and directly concerned with the control of the light shield amount. FIG. 4 shows the light shield members 91a and 91b opened to a certain degree in an intermediate stage of light shield amount. Each of the first and second light shield members 91a and 91b is formed by a flat-plate-shaped material having a three-dimensional concaved and convexed part. More specifically, the first light shield member 91a has a concave portion 92a disposed at the center, i.e., near the system optical axis SA, and a pair of flat portions 93a and 93a separately disposed on both sides of the concave portion 92a and located away from the system optical axis SA, i.e., extending in the ±X direction away from the concave portion 92a. Thus, the first light shield member 91a controls the light shield amount of the central part of light by using the concave portion 92a, and controls the light shield amount of the peripheral part of light by using the flat portions 93a and 93a. Similarly, the second light shield member 91b has a concave portion 92b and a pair of flat portions 93b and 93b. As schematically illustrated in FIG. 5, the pair of the light shield members 91a and 91b generally extend substantially in parallel with the X-Y plane perpendicular to the system optical axis SA in the maximum light shield condition. The light control device 80 rotates the light shield members 91a and 91b of the light shield units 82a and 82b around the center axes AX1 and AX2 as the pair of the rotation axes extending in the X direction and disposed away from each other by about the half width of the illumination light with the system optical axis SA interposed between the center axes AX1 and AX2, and increases and decreases the clearance between the light shield members 91a and 91b to open and close the optical path in the ±Y direction as the opening and closing direction perpendicular to the system optical axis SA. The opening and closing direction of the ±Y direction extends in parallel with either the arrangement direction of the X direction or the arrangement direction of the Y direction for the lens elements constituting the pair of the lens arrays 31 and 32.

Returning to FIGS. 2 and 3, the first opening and closing member 98a as one of the pair of the first and second opening and closing members 98a and 98b included in the first and second light shield units 82a and 82b, for example, is made of a single material (such as stainless steel and aluminum) containing the first light shield member 91a. The first opening and closing member 98a is a component formed by press working of the single material to have a continuously uniform thickness, and has the concave portion 92a, the flat portions 93a and 93a, and the support members 94a and 95a formed integrally with one another. The concave portion 92a has a semi-cylindrical curved surface formed by the press working in such a manner as to extend in the Y direction and convex in the −Z direction under the maximum light shield condition. That is, the concave portion 92a has a curved shape concaved in the rotation direction for opening the light shield member 91a from the closing condition (that is, concaved in the opening condition side). On the other hand, the flat portions 93a and 93a disposed on the periphery of the concave portion 92a have flat shapes extending flat in the X and Y directions.

According to the first light shield member 91a having this structure, a first leading edge EG of the first light shield member 91a as the system optical axis SA side leading edge has an uneven shape with respect to the direction of the system optical axis SA under the maximum light shield condition. In other words, as can be seen from FIG. 4, the leading edge EG of the light shield member 91a has a second area corresponding to an end HS of the circular-arc-shaped concave portion 92a, and a first area corresponding to ends TS of the linear flat portions 93a. The end HS and ends TS are disposed along a line LA having unevenness in the direction of the system optical axis SA under the maximum light shield condition of the first light shield member 91a. The leading edge EG corresponds to the boundary between a light shield area SS for illumination light and a non light shield area NS for illumination light during the rotation operation (see FIG. 6A). The contour of the leading edge EG as viewed in a direction along the system optical axis SA (see FIG. 6B) becomes flat, i.e., linear under the maximum light shield condition of the first light shield member 91a. The leading edge EG corresponds to the edge portion of the light shield member 91a included in the end portion (edge portion) of the first light shield unit 82a, and passes through the effective range of the optical path of the illumination light during the opening and closing operation. Thus, the edge portions of the support members 94a and 95a disposed adjacent to the light shield member 91a always lie out of the effective range of the optical path of the illumination light, and thus do not affect the control of the illumination light amount during the opening and closing operation. Accordingly, the edge portions of the support members 94a and 95a as a part of the first light shield unit 82a is not included in the leading edge EG herein.

As illustrated in FIG. 2 and other figures, the second light shield unit 82b as the other unit of the light control device 80 symmetrized with the first light shield unit 82a has structure similar to that of the first light shield unit 82a. More specifically, the second opening and closing member 98b is a component made of a single material and formed by press working, and the second light shield member 91b includes the concave portion 92b disposed at the center and the flat portions 93b and 93b disposed on both sides of the concave portion 92b and forms a second leading edge EG which contains the second area corresponding to the circular-arc end HS and the first area corresponding to the linear ends TS similarly to the first light shield member 91a.

The drive mechanism 85 of the light control device 80 has a motor 85a which gives power to the first and second light shield units 82a and 82b, and a transmission portion 85b. The light shield members 91a and 91b provided on the first and second light shield units 82a and 82b are rotatable in accordance with the operation of the drive mechanism 85 received from the transmission portion 85b via the pair of the drive gears 86a and 86b.

The operation of the light control device 80 is now explained with reference to FIG. 3 and other figures. The rotation of the motor 85a of the drive mechanism 85 is transmitted through the transmission portion 85b to the pair of the drive gears 86a and 86b provided on the pair of the light shield units 82a and 82b. In this case, the upper drive gear 86a and the lower drive gear 86b rotate in synchronization with each other in the opposite directions. The rotational support shafts 83a and 83b rotate in synchronization with each other by the rotations of the pair of the drive gears 86a and 86b, thereby the pair of the light shield members 91a and 91b similarly rotate in synchronization with each other. By this method, the drive mechanism 85 opens and closes the first and second light shield members 91a and 91b in synchronization with each other in the outward direction. In this case, the pair of the light shield members 91a and 91b change their conditions in accordance with the normal rotation or reverse rotation of the motor 85a.

More specifically, the light shield members 91a and 91b become substantially parallel with the second lens array 32 to come into the maximum light shield condition where the leading edges EG and EG lie closest to the system optical axis SA as indicated by solid lines in FIG. 5, or rotate by a rotation angle β (approximately 90 degrees) from the full-close condition substantially parallel with the second lens array 32 to come into the full-open condition where the leading edges EG and EG lie out of the optical path (out of the effective range) of the illumination light with no light shield of the illumination light provided as indicated by alternate long and short dash lines in accordance with the rotations of the light shield members 91a and 91b around the center axes AX1 and AX2. In addition, the light shield members 91a and 91b rotate by a rotation angle α (0°<α<β) from the full-close condition substantially parallel with the second lens array 32 to come into a condition where the leading edges EG and EG are separated from the system optical axis SA by a certain length to shield a part of the illumination light as an intermediate condition as indicated by broken lines.

Accordingly, the leading edges EG and EG of the first and second light shield units 82a and 82b come close to or away from each other in the Y direction as the opening and closing direction with the system optical axis SA interposed between the leading edges EG and EG to control the shield amount of the illumination light. In this case, the light shield amount is determined by the rotation angle α of the light shield members 91a and 91b and the contour shapes of the leading edges EG and EG as viewed in the direction of the system optical axis SA at the corresponding rotation angle α in any light shield conditions. The first and second light shield units 82a and 82b may be constituted only by the first and second opening and closing members 98a and 98b with the first and second attachment units 99a and 99b separately assembled to the first and second light shield units 82a and 82b. In this case, each of the first and second light shield units 82a and 82b is formed by a single material.

Figure 6:
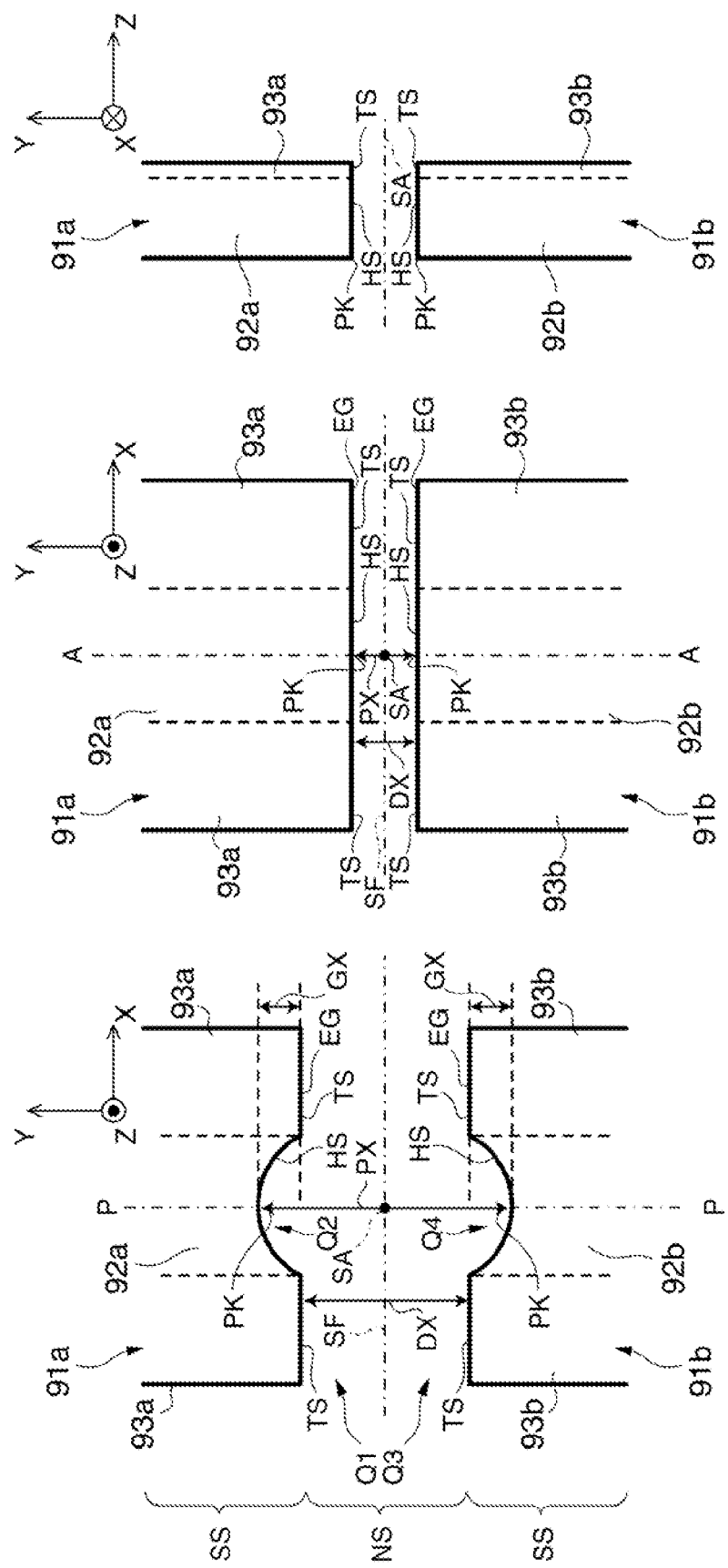
FIGS. 6A through 6C illustrate conditions of the light shield members during opening and closing operation of the light control device.

FIGS. 6A and 6B illustrate the light shield members 91a and 91b as viewed in the direction along the system optical axis SA from the second lens array 32, i.e., from the optical path downstream side. FIG. 6C is a side cross-sectional view taken along a line A-A in FIG. 6B, corresponding to the direction of the light shield members 91a and 91b shown in FIG. 5.

The light shield members 91a and 91b shown in FIGS. 6A and 6B correspond to the conditions of the light shield members 91a and 91b indicated by the broken lines and solid lines in FIG. 5, respectively. More specifically, FIG. 6A shows the light shield members 91a and 91b rotated by the rotation angle α in the front view as viewed in the −Z direction from the optical path downstream side, and FIG. 6B shows the light shield members 91a and 91b under the maximum light shield condition in the front view as viewed in the −Z direction from the optical path downstream side. While FIGS. 6A and 6B illustrate the conditions as viewed in the −Z direction from the optical path downstream side, i.e., the light exit side, the contours of the leading edges EG and EG have the same shapes as viewed in the +Z direction from the optical path upstream side, i.e., the light entrance side.

As can be seen from FIG. 6A showing the opening condition rotated by the rotation angle α, the contours of the ends HS and HS disposed in the central areas of the leading edges EG and EG look like bow-shaped notches by the shapes of the concave portions 92a and 92b concaved in the rotation direction for opening. On the other hand, the contours of the ends TS and TS disposed on the peripheries of the leading edges EG and EG are kept linear even in the opening condition. Thus, the non light shield area NS, i.e., the opening under the condition of the light shield members 91a and 91b rotated by the rotation angle α and brought into the intermediate condition between the full-close condition and the full-open condition as shown in FIG. 6A has a shape defined by the linear contours extending in the X direction and the expanded contours at the centers between the linear contours. On the other hand, the non light shield area NS under the full-close condition of the light shield members 91a and 91b shown in FIG. 6B becomes a linear slit-shaped area extending in the X direction. Thus, in the condition shown in FIG. 6A, a larger amount of light passes through the notch-shaped area formed by the ends HS and HS in the central portion of the light close to the system optical axis SA, while the peripheral portion of the light away from the system optical axis SA is shielded by the linear area formed by the ends TS and TS similarly to the ordinary light shield achieved by rectangular plate-shaped components. That is, the amount of the light shield by using the leading edges EG and EG becomes smaller than that of the ordinary light shield produced by the rectangular plate-shaped components by the amount corresponding to the notch-shaped second area. In the condition shown in FIG. 6B as the maximum light shield condition, however, the contours of the ends HS and HS of the concave portions 92a and 92b become linear similarly to the contours of the ends TS and TS of the flat portions 93a and 93b. That is, the end HS and the ends TS and TS are aligned on a line for each of the concave portions 92a and 92b as viewed in the Z direction. In this case, therefore, light shield by the leading edges EG and EG becomes equivalent to the ordinary light shield produced by the rectangular plate-shaped components.

The difference in the area through which light passes between the case shown in FIG. 6A and the case shown in FIG. 6B is now explained based on the distance between the light shield members 91a and 91b in the opening and closing direction (Y direction). In the case shown in FIG. 6A where the light shield members 91a and 91b are rotated through the rotation angle α as the intermediate condition between the full-close condition and the full-open condition, the maximum distance of the clearance, i.e., the opening width in the Y direction between a first portion Q1 including the end TS on the light peripheral side of the first leading edge EG on the first light shield member 91a and a third portion Q3 including the end TS of the second light shield member 91b opposed to the first portion Q1 is set at a first distance DX. Also, the maximum distance of the clearance, i.e., the opening width in the Y direction between a second portion Q2 including the end HS on the light central side of the first leading edge EG on the first light shield member 91a and a fourth portion Q4 including the end HS of the second light shield member 91b opposed to the second portion Q2 (that is, the distance between highest points PK and PK) is set at a second distance PX. In this case, the first distance DX becomes shorter than the second distance PX. The first distance DX is shorter than the second distance PX by the depths of the concave portions 92a and 92b in the Y direction. That is, the difference between the second distance PX and the first distance DX corresponds to a distance GX between an extension line of the end TS of the flat portion 93a and the highest point PK of the concave portion 92a and the similar distance GX between the end TS of the flat portion 93b and the highest point PK of the concave portion 92b, that is, the doubled distance GX. On the other hand, in the case shown in FIG. 6B where the light shield members 91a and 91b are in the full-close condition, the highest points PK and PK lie on the extension line of the end TS, and the second distance PX and the first distance DX become equivalent to each other. According to this arrangement, with respect to a reference surface SF containing the system optical axis SA and extending in parallel with the center axes AX1 and AX2, the difference between the maximum distance from the reference surface SF to the highest point PK of the end HS and the maximum distance from the reference surface SF to the end TS gradually decreases in accordance with the rotation for gradually increasing the light shield area SS. The degree affecting the change of the light shield amount exhibited as the difference between the second distance PX and the first distance DX corresponding to the opening width between the light shield members 91a and 91b is determined by the shapes of the ends HS and HS of the concave portions 92a and 92b. According to this embodiment, the light shield members 91a and 91b have the concave portions 92a and 92b to make the change of the light shield amount relatively smooth and also to sufficiently lower the amount of illumination light under the maximum light shield condition.

The change of the light shield area of the light shield members 91a and 91b produced by varying the concave depths of the contours of the concave portions 92a and 92b in the Y direction as viewed in the direction of the system optical axis SA in accordance with the rotation operation is, when considering from the opposite side, a change equivalent to the change of the size and shape of the illumination light projection area for the second lens array 32 subsequently disposed by varying the positions of the light shield members 91a and 91b. That is, the light shield members 91a and 91b are considered as control members for controlling the light transmission amount by varying the shape of the illumination projection area.

3. Change of Light Shield Area by Light Control Device

Figure 7:
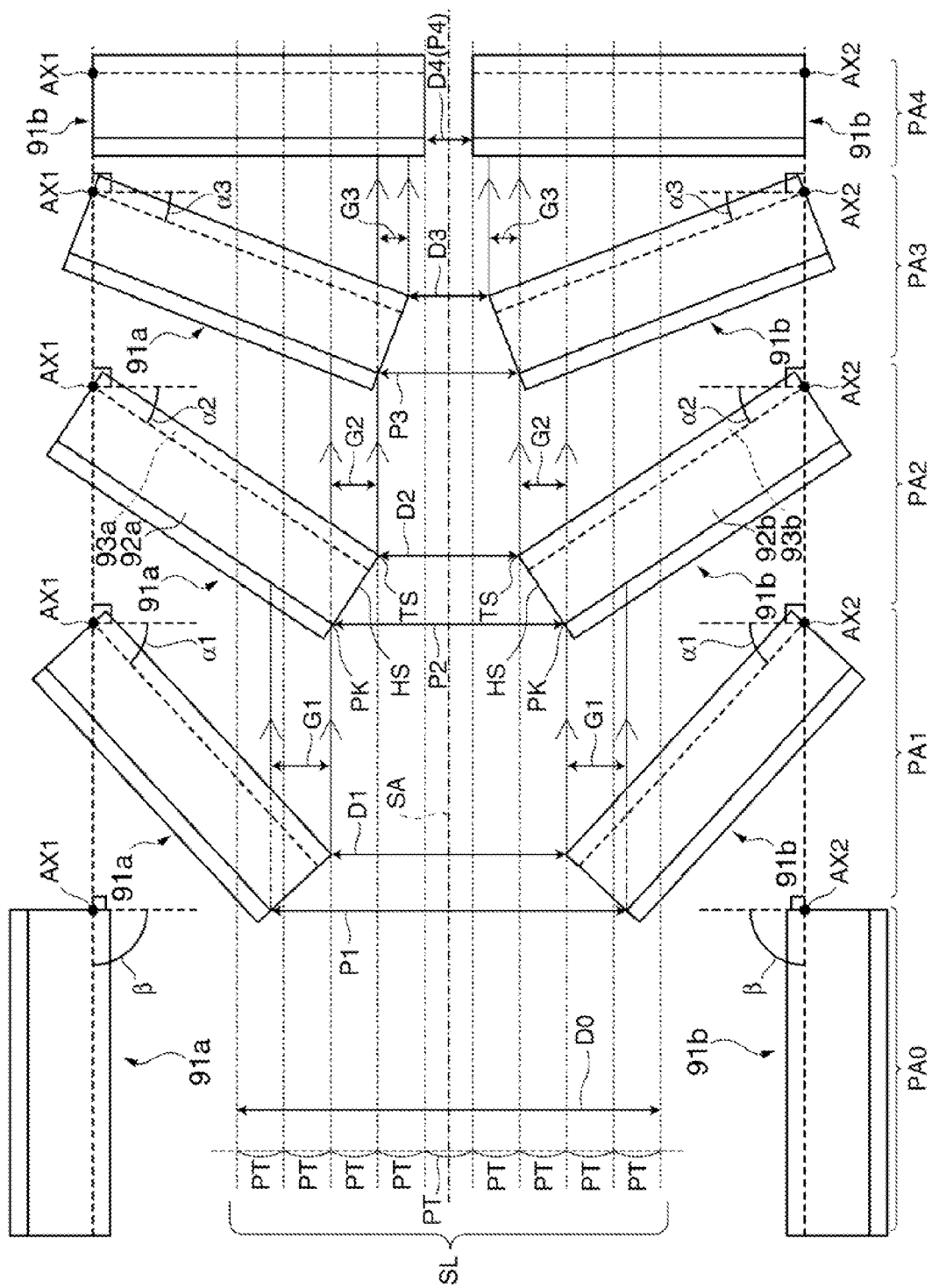
FIG. 7 illustrates the change of the light shield amount produced by the light shield members.

FIG. 7 shows the detailed concept of the change of the light shield amount (i.e., the transmission amount of illumination light when considered from the opposite side) produced by the operation of the light control device 80. The pair of the light shield amount 91a and 91b schematically shown in FIG. 7 are cut along surfaces passing through the highest points PK and PK (P-P cross section in FIG. 6A). As shown in FIG. 7, the maximum area of illumination light SL is indicated as an area D0. For easy understanding of the change of the light shield area, the illumination light SL is divided by equal intervals PT in the Y direction as indicated by dotted lines.

The light shield members 91a and 91b change the area for shielding the illumination light SL by rotating in the manners of patterns PA0 through PA4 to control the illumination light SL. The pattern PA0 corresponds to the full-open condition, i.e., the condition at the rotation angle β of approximately 90 degrees. The pattern PA4 corresponds to the full-close condition, i.e., the condition at the rotation angle of approximately 0 degree. The patterns PA1 through PA3 show the respective steps of different light shield conditions at the corresponding rotation angles α (0°<α3<α2<α1<90°).

In the pattern PA0, the rotation angle β is approximately 90 degrees, and the light shield members 91a and 91b do not shield the illumination light SL. In this case, all the components of the illumination light SL pass to be used as illumination light.

In the patterns PA1 through PA3, the rotation angle α varies from a rotation angle α1 to a rotation angle α3, and the light shield amount produced by the light shield members 91a and 91b changes accordingly. More specifically, the pattern PA2 in FIG. 7 shows the conditions of the light shield members 91a and 91b in the intermediate light shield condition, i.e., in the condition at the rotation angle α2 (α3<α2<α1). In this case, a distance D2 between the ends TS and TS of the flat portions 93a and 93b on the light peripheral side (corresponding to the first distance DX in FIG. 6A) is equivalent to the three intervals PT. A distance P2 between the highest points PK and PK as the maximum distance between the ends HS and HS of the concave portions 92a and 92b in the light central area (corresponding to the second distance PX in FIG. 6A) is equivalent to the five intervals PT. Thus, each of a distance G2 between the end TS on the peripheral side of the light shield member 91a and the highest point PK in the central area and the similar distance G2 between the end TS on the peripheral side of the light shield member 91b and the highest point PK in the central area (corresponding to the distance GX in FIG. 6A) is equivalent to the one interval PT. On the other hand, in the pattern PA1 where the light shield members 91a and 91b are opened more than in the pattern PA2, the distance D1 between the ends TS and TS and the distance P1 between the highest points PK and PK are longer than the distance D2 and the distance P2, respectively. In this case, a distance G1 between the end TS and the highest point PK is longer than the one interval PT, that is, longer than the distance G2. This condition corresponds to the condition that the bow-shaped contour of the end HS of the concave portion 92a shown in FIG. 6A has a sharper curve. On the contrary, in the pattern PA3 where the light shield members 91a and 91b are closed more than in the pattern PA2, distances D3 and P3 are shorter than the distances D2 and P2, respectively. In this case, a distance G3 is shorter than the one interval PT, that is, shorter than the distance G2. This condition corresponds to the condition that the bow-shaped contour of the end HS of the concave portion 92a shown in FIG. 6A has a smoother curve. Thus, the bow-shaped contour is variable for each stage of the rotation operations.

In the pattern PA4, the contour of the end HS as viewed in the direction of the system optical axis SA becomes linear, and thus the entire contour of the end edge EG becomes a straight line (see FIG. 6B). In this case, the distance D4 is equivalent to the distance P4 similarly to the condition of the ordinary light shield.

Accordingly, in the intermediate condition between the full-open condition and the maximum light shield condition, the ends HS and HS of the concave portions 92a and 92b function as notches at the leading edges EG, and the notches become larger as the rotation angles of the light shield members 91a and 91b increase. In this case, the light shield amount in the vicinity of the system optical axis SA, i.e., the light shield amount in the light central area more decreases (that is, the light pass amount more increases) in accordance with increase in the rotation angle α than the structure of the ordinary light shield which uses the plate-shaped components having the flat leading edges EG and EG. On the other hand, the light shield members 91a and 91b gradually reduce the function of the notches at the ends HS and HS in accordance with decrease in the rotation angle α, allowing each of the contours of the leading edges EG and EG to become a line in the maximum light shield condition. In this case, the light shield members 91a and 91b shield a sufficiently large amount of light similarly to the ordinary light shield using the plate-shaped components having the flat leading edges EG and EG. According to this structure, the concave portions 92a and 92b control the light shield amount by affecting the change of the light shield amount in accordance with the rotation angle. Thus, the light shield members 91a and 91b having simple structure formed by one component and only needed to be rotated can produce relatively smooth change of the light shield amount and sufficiently lower the illumination light amount in the maximum light shield condition even when disposed in the vicinity of the lens arrays 31 and 32. Accordingly, the projector 100 which includes the light control device 80 having the light shield members 91a and 91b constructed as above is possible to obtain high dynamic contrast, and thus form a high-quality image by light control having preferable response.

The leading edges EG and EG during the rotation operation can be considered in the following manner as well. As can be seen from FIG. 7 and other figures, the first areas each of which contains the ends TS and TS provided at two positions separately on the peripheral side of the leading edge EG rotate around the center axes AX1 and AX2 of the light shield members 91a and 91b as rotation axes. The second areas each of which contains the end HS in the central area of the leading edge EG and is disposed between the ends TS and TS of the first area and rotate around the center axes AX1 and AX2 of the light shield members 91a and 91b as the rotation axes while kept positioned on the light source lamp unit 20 (see FIG. 1) side with respect to the ends TS and TS of the first areas. In this embodiment, therefore, the angles or positions of the second areas containing the ends HS and HS in the central areas are different from those of the first areas containing the ends TS and TS on the peripheral side during rotation. Thus, in case of the light shield member 91a, for example, a first virtual plane VS1 including the ends TS of the first area and the center axis AX1 and a second virtual plane VS2 including the highest point PK of the end HS and the center axis AX1 cross each other along the center axis AX1 as the cross line as illustrated in FIG. 5. When the reference plane of the light shield member 91a is the plane perpendicular to the system optical axis SA, the angle formed by the first virtual plane VS1 and the reference plane is kept smaller than the angle formed by the second virtual plane VS2 and the reference plane. In this case, the distance between the center axis AX1 and the end HS and the distance between the center axis AX1 and the end TS (or the respective distances between the center axis AX2 and the ends HS and TS) are substantially equal to each other, and the relative positional relationship between the end HS and the end TS is maintained. However, the notched contour can be produced by the positional difference between the end HS and the end TS in the Y direction under the open condition, and the linear contour can be produced by the alignment of the end HS and the end TS in the Y direction under the maximum light shield condition. Accordingly, such an effect that the contour of the light shield area (or the illumination light projection area for the second lens array 32) changes in accordance with the rotation operation can be produced.

In the case of a structure which includes the flat-plate-shaped light shield members 91a and 91b not having the concave portions 92a and 92b and has the leading edges EG and EG whose contour shapes are continuously linear, for example, light scarcely decreases in the area where no light source image is formed by the first lens array 31. In this case, light sharply decreases immediately after passing through the area where the light source image is formed. Thus, smooth light reduction is difficult to be achieved. According to this embodiment which has the variable ends HS and HS provided at the edges of the concave portions 92a and 92b to produce the notched, i.e., bow-shaped contours, however, the width of the opening in the central area in the vicinity of the system optical axis SA is different from the width of the opening on the peripheral side away from the system optical axis SA, and this difference varies (see the first distance DX and the second distance PX in FIG. 6A). In this case, the condition caused when the contours are linear is not produced, and light can be gradually decreased in accordance with the rotation angle of the rotation operation performed by the light shield members 91a and 91b.

Second Embodiment

A projector according to a second embodiment of the disclosure is now described with reference to FIG. 8. The projector in this embodiment is a modified example of the projector 100 shown in FIG. 1, and has structure similar to that of the projector 100 except for the shapes of first and second light shield members 191a and 191b provided on first and second light shield units 182a and 182b. Thus, only the parts corresponding to the parts in FIG. 4 are shown in FIG. 8, and the entire structures of the light control device and the projector are not described nor depicted herein.

Figure 8:
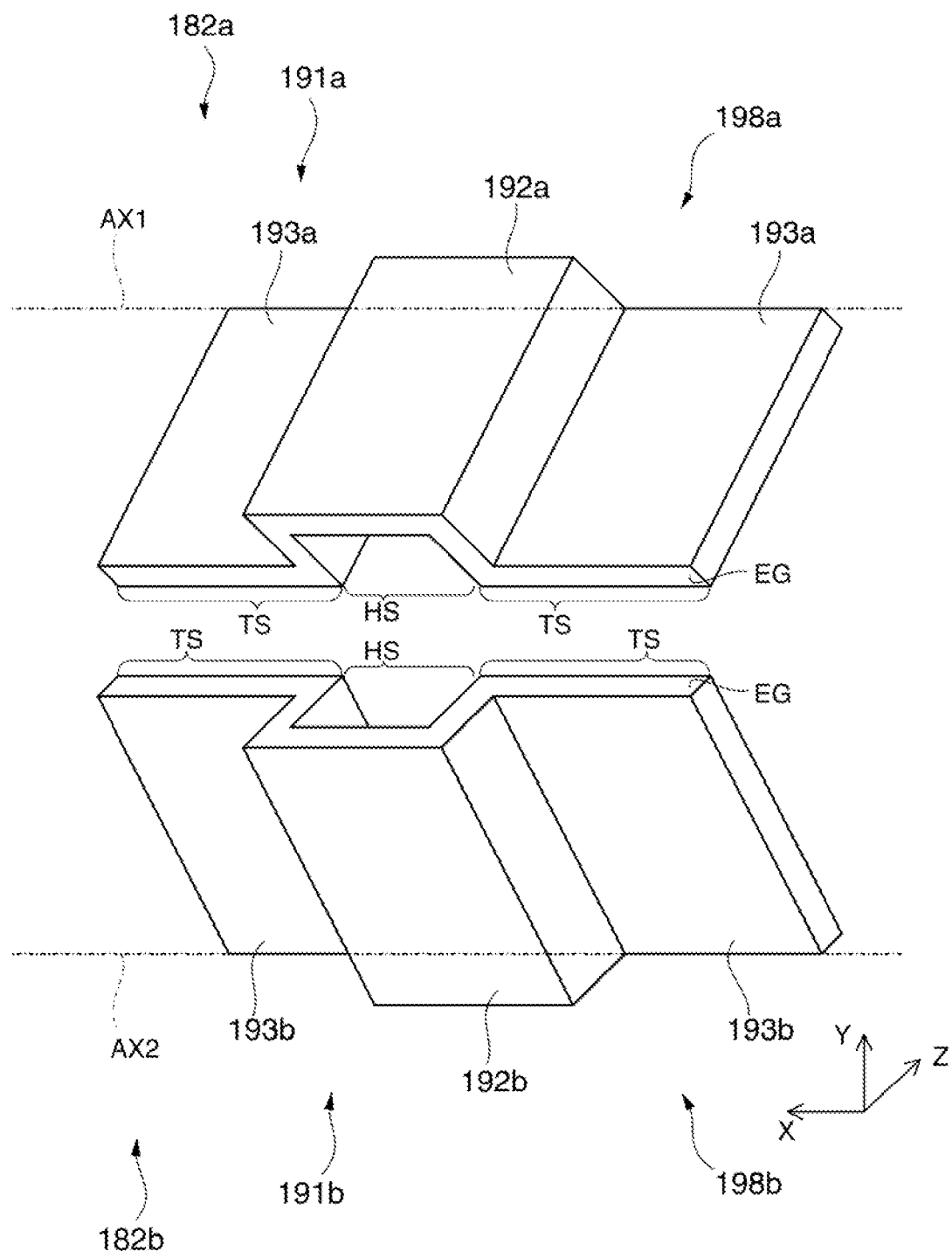
FIG. 8 is a perspective view schematically illustrating the structure of light shield members included in a projector according to a second embodiment.

The first and second light shield members 191a and 191b of the first and second light shield units 182a and 182b shown in FIG. 8 are stair-shaped or step-shaped. More specifically, concave portions 192a and 192b of the light shield members 191a and 191b extend in the Y direction under the maximum light shield condition and have hollow prism shapes convexed in the −Z direction. In the intermediate condition between the full-open condition and the maximum light shield condition, the concave portions 192a and 192b form rectangular notches by the leading edges EG and EG. The light shield members 191a and 191b are formed integrally with opening and closing members 198a and 198b, respectively, by press working in the manufacturing step of the opening and closing members 198a and 198b similarly to the first embodiment. The concave portions 192a and 192b have surfaces concaved in the rotation direction for opening the light shield members 191a and 191b similarly to the first embodiment. The leading edge EG of the first light shield member 191a has the first area having the ends TS and TS of flat portions 193a and the second area having the end HS of the concave portion 192a, and the leading edge EG of the second light shield member 191b has the first area having the ends TS and TS of flat portions 193b and the second area having the end HS of the concave portion 192b similarly to the light shield members 91a and 91b in the first embodiment. According to this structure, the sizes of the rectangular notches formed by the contours of the leading edges EG and EG vary in accordance with the rotation operation to produce relatively smooth change of the light shield amount and sufficiently lower the illumination light amount under the maximum light shield condition similarly to the light shield members 91a and 91b shown in FIG. 4 and other figures.

Third Embodiment

Figure 9:
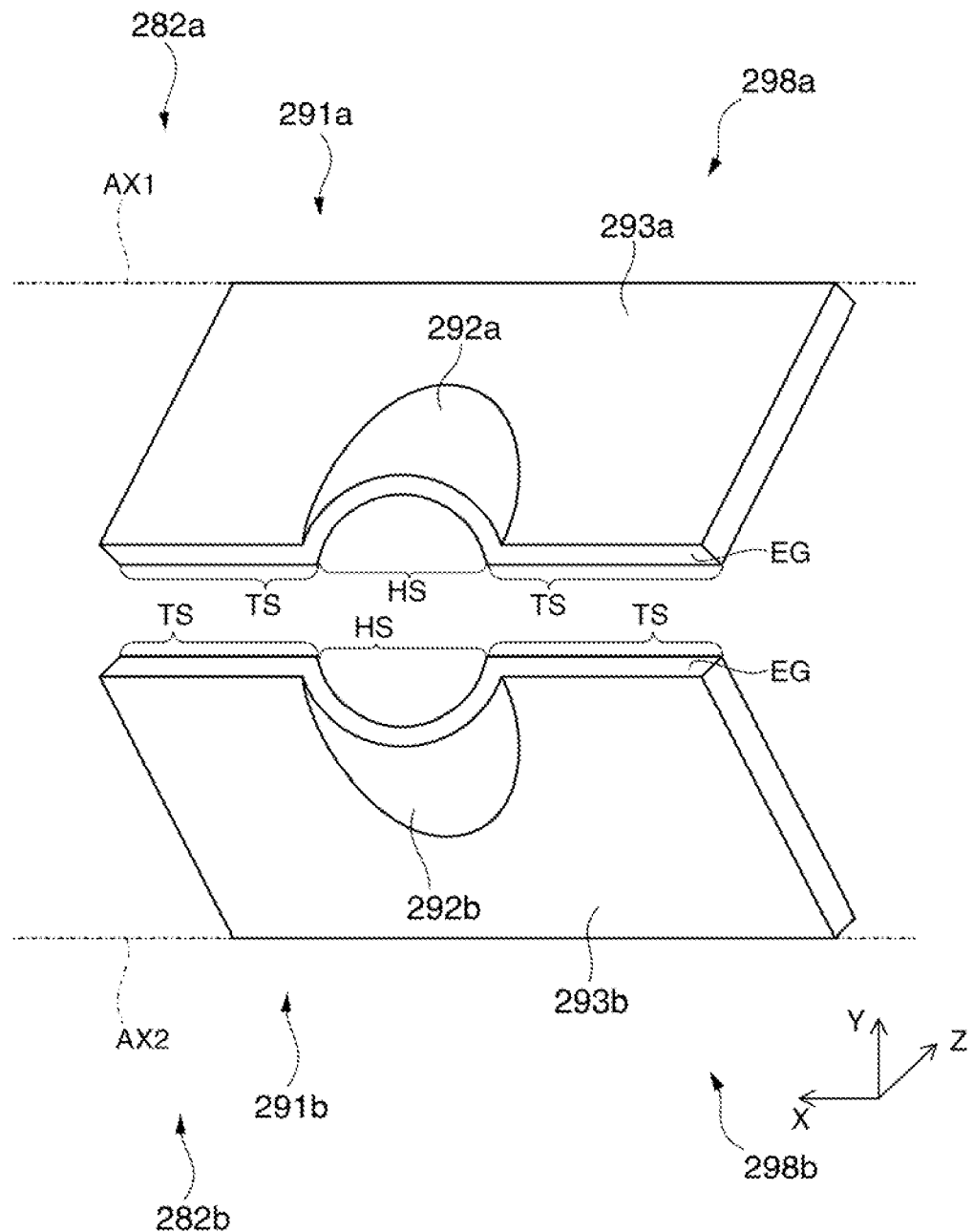
FIG. 9 is a perspective view schematically illustrating the structure of light shield members included in a projector according to a third embodiment.

A projector according to a third embodiment of the disclosure is now described with reference to FIG. 9. The projector in this embodiment is a modified example of the projector 100 shown in FIG. 1. Thus, only the parts corresponding to the parts in FIG. 4 are shown in FIG. 9, and structures other than those parts are not described nor depicted herein similarly to the second embodiment.

First and second light shield members 291a and 291b provided on first and second light shield units 282a and 282b are different from the light shield members 91a and 91b shown in FIG. 4 in that concave portions 292a and 292b of the first and second light shield members 291a and 291b are manufactured by drawing. More specifically, the areas corresponding to the leading edges EG of the concave portions 292a and 292b are formed by press working containing not a bending process but a drawing process in the manufacturing step of opening and closing members 298a and 298b. The concave portions 292a and 292b formed by the drawing process have freely curved surface shapes. In this case, the leading edges EG and EG of the first and second light shield members 291a and 291b obtain the first areas containing the ends TS and TS of flat portions 293a and 293b and the second areas containing the ends HS and HS of the concave portions 292a and 292b similarly to the first and second light shield members 91a and 91b by controlling the freely curved surface shapes such that the ends HS and HS of the concave portions 292a and 292b and the ends TS and TS of the flat portions 293a and 293b at the leading ends of the light shield members 291a and 291b become similar to the shapes of the ends HS and HS and the ends TS and TS of the light shield members 91a and 91b shown in FIG. 4 and other figures. According to this structure, the change of the light shield amount becomes relatively smooth, and the illumination light amount sufficiently lowers under the maximum light shield condition.

Fourth Embodiment

A projector according to a fourth embodiment of the disclosure is now described with reference to FIG. 10 and FIGS. 11A through 11C. The projector in this embodiment is a modified example of the projector 100 shown in FIG. 1. Thus, only a pair of light shield units are shown in FIG. 10 and other figures, and structures and functions other than the light shielding units are not described nor depicted.

Figure 10:
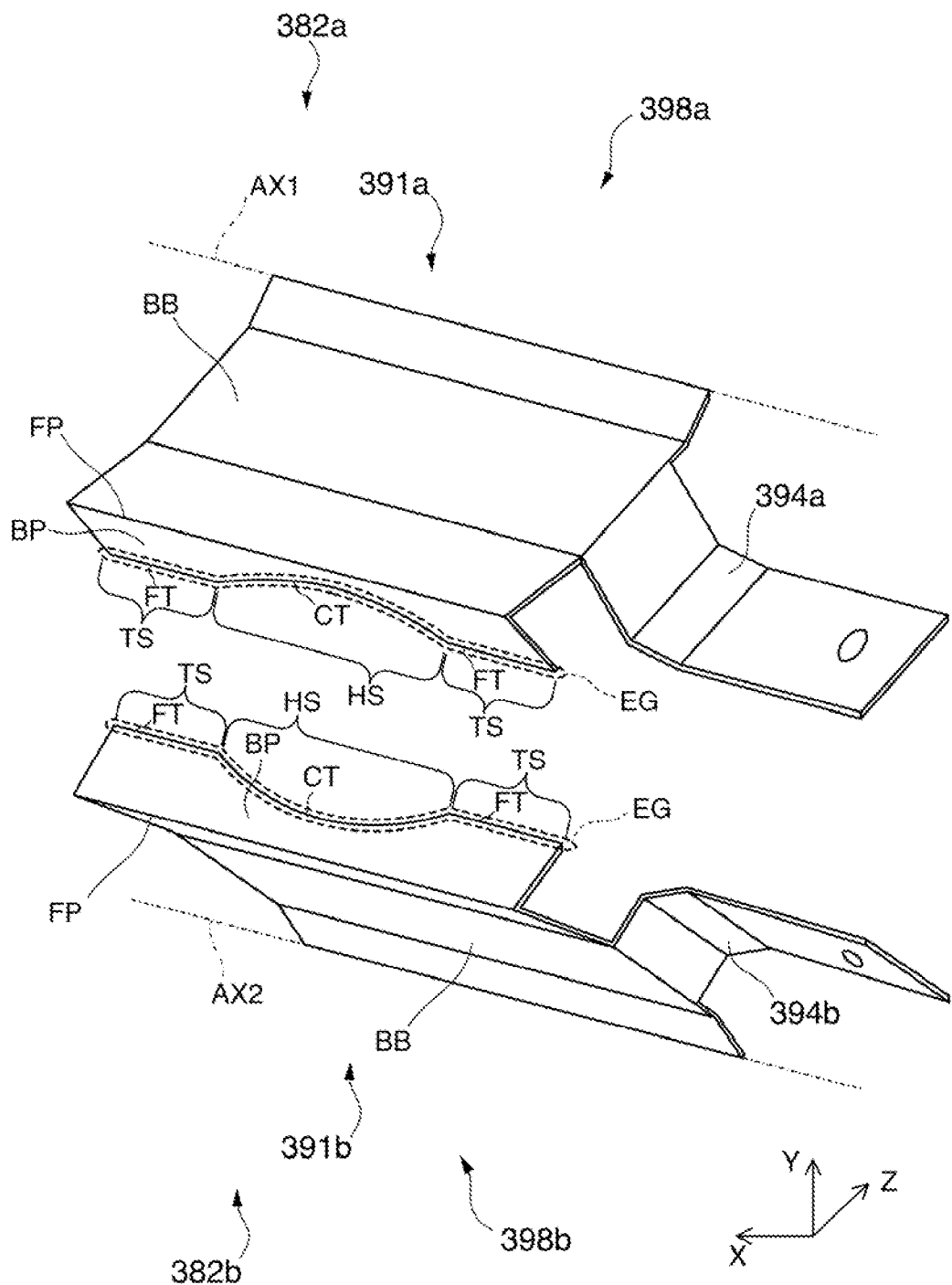
FIG. 10 is a perspective view schematically illustrating the structure of light shield members included in a projector according to a fourth embodiment.

As illustrated in FIG. 10, first and second light shield units 382a and 382b have first and second opening and closing members 398a and 398b. FIG. 10 shows the first and second opening and closing members 398a and 398b opened to a certain degree to achieve an intermediate level of light shield amount.

The first opening and closing member 398a formed by press working of sheet metal has a first light shield member 391a and a support member 394a. The support member 394a extends in the −X direction from the side of the root of the first light shield member 391a to support the first light shield member 391a such that the first light shield member 391a can rotate around the center axis AX1 extending in the X direction. Similarly, the second opening and closing member 398b formed by press working of sheet metal has a second light shield member 391b and a support member 394b. The support member 394b extends in the −X direction from the side around the root of the second light shield member 391b to support the second light shield member 391b such that the second light shield member 391b can rotate around the center axis AX2 extending in the X direction.

As illustrated in FIG. 10 and other figures, the first light shield member 391a has a shape bended in such a manner as to extend in the optical path downstream direction under the maximum light shield condition, and has a main portion BB having a substantially flat plate shape and rotatable around the center axis AX1, and a plate-shaped end portion BP extended from the end of the main portion BB on the side away from the center axis AX1 and bended in such a manner as to have a depth substantially in the tangential direction of the rotation. Similarly, the second light shield member 391b has the main portion BB and the end portion BP. Notches CT and CT as edges of horizontally elongated circular-arc notches are formed at the optical path downstream ends of the end portions BP and BP of the light shield members 391a and 391b in the central area, i.e., in the area close to the system optical axis SA under the maximum light shield condition. The notches CT and CT form the bow-shaped ends HS and HS. The notches CT and CT have shapes concaved in the rotation direction for changing from the close condition to the open condition (that is, concaved in the direction of opening the first and second light shield members 391a and 391b). The areas of the end portions BP and BP on the peripheral side of the notches CT and CT, that is, on the side away from the system optical axis SA do not have notches but have flat portions FT and FT to produce the ends TS and TS. The ends HS and HS and the ends TS and TS form the leading edges EG and EG of the end portions BP and BP. The leading edges EG and EG of the first and second light shield members 391a and 391b have the first area including the ends TS and TS of the flat portions FT and FT of the end portions BP and BP and the second area including the ends HS and HS of the notches CT and CT similar to the light shield members 91a and 91b in the first embodiment. The end portions BP and BP have ridge lines FP and FP as the boundaries between the end portions BP and BP and the main portions BB and BB of the light shield members 391a and 391b on the side opposite to the leading edges EG and EG side. The positions of the leading edges EG and EG, that is, the positions of the ends HS and HS and the ends TS and TS on the first and second light shield members 391a and 391b are controlled by adjusting the degree of bending of the end portions BP and BP along the ridge lines FP and FP with respect to the main bodies and the depths of the end portions BP and BP.

According to this structure in this embodiment, the contours of the leading edges EG and EG, that is, the contours of the ends HS and HS and the ends TS and TS become similar to the contours of the ends HS and HS and the ends TS and TS of the first and second light shield members 91a and 91b shown in FIG. 4 and other figures. Thus, the shape of the light shield area (the illumination light projection area as considered from the opposite side) formed by the leading edges EG and EG can be changed by the rotation operation of the light shield members 391a and 391b similar to the first embodiment.

Figure 11A:
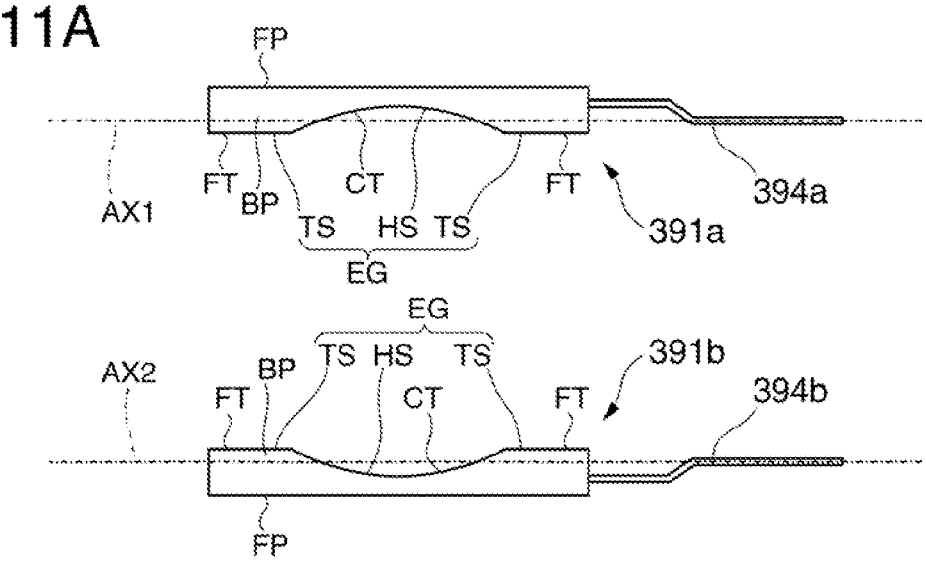
FIGS. 11A through 11C illustrate conditions of light shield units during opening and closing operation.
Figure 11B:
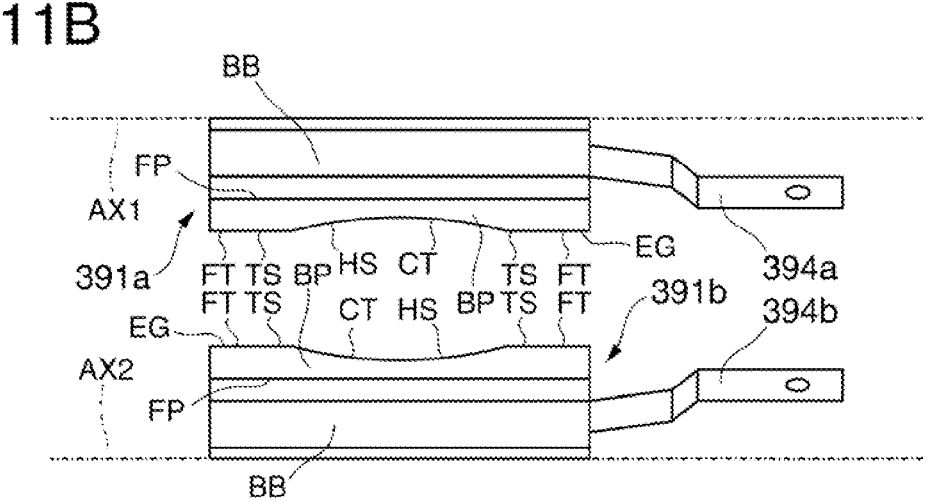
Figure 11C:
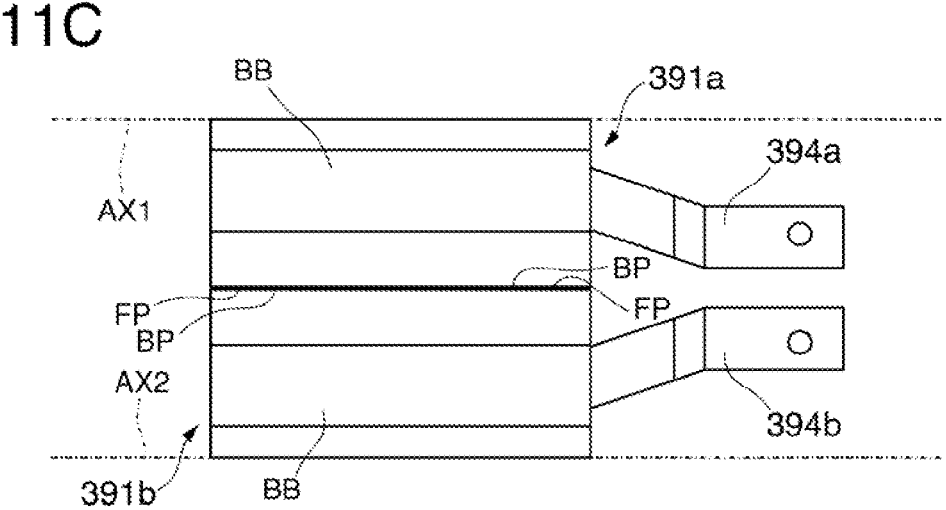

As illustrated in FIGS. 11A through 11C, the first and second light shield members 391a and 391b are brought into the full-open condition (see FIG. 11A), the full-close condition (maximum light shield condition; see FIG. 11C), and the intermediate open condition (see FIG. 11B) by the rotation operation. In this case, the light shield members 391a and 391b having the structure described above change the bow-shaped contours of the ends HS and HS in the manner similar to the shape shown in FIG. 6A and other figures in the first embodiment. More specifically, in the open condition shown in FIG. 11A, the bow-shaped contours of the ends HS and HS are sharp. However, in the intermediate condition shown in FIG. 11B, the bow-shaped contours of the ends HS and HS become slightly smooth, and the light shield amount changes in accordance with the rotation angle. As a result, the change of the light shield amount becomes smooth. In the full-close condition shown in FIG. 11C, the entire contours of the light shield area formed by the ridge lines FP and FP of the end portions BP and BP become linear contours similarly to the case shown in FIG. 6C. Accordingly, the light shield amount changes relatively smoothly, and the illumination light amount sufficiently lowers under the maximum light shield condition similarly in this embodiment. The linear contours can be formed by any parts of the end portions BP or the entire end portions BP other than the ridge lines FP and FP by controlling the degree of bending of the end portions BP and BP.

The disclosure is not limited to the embodiments described herein but may be practiced otherwise without departing the scope of the disclosure. For example, the following modifications may be made.

According to certain embodiments, each of the ends HS and HS of the concave portions 92a, 92b, 192a, 192b, 292a, and 292b has a circular-arc shape or a one step concave (convex) shape. However, each of the ends HS and HS may have various types of shape such as a V-shaped valley shape, and a plurality of circular-arc or step shapes produced by changing the degree of bending in the bending process or the shape of the freely curved surface in the drawing process depending on the change of the necessary light shield amount.

According to the first and second embodiments, the uniform cylindrical and hollow prism-shaped concave portions 92a, 92b, 192a, and 192b are formed by the bending process. However, the shapes of the leading edges EG which affect the change of the light shield amount may be formed by the drawing process as in the third embodiment or other processing methods.

According to certain embodiments, each pair of the light shield members 91a and 91b, 191a and 191b, 291a and 291b, and 391a and 391b are symmetric with respect to the system optical axis SA. However, these members may be asymmetric depending on the characteristics of the light source or the like.

According to at least some of the embodiments, for example, the light control device 80 which includes the pair of the light shield units 82a and 82b opened and closed in the outward direction has been discussed. However, only a single light shield plate may be rotated.

According to the first through third embodiments, a clearance is left between the first light shield member 91a and the second light shield member 91b, between the first light shield member 191a and the second light shield member 191b, or between the first light shield member 291a and the second light shield member 291b under the full-close condition of these members. However, the clearance between the first light shield member and the second light shield member is not required to be left in the full-close condition, or the size of the clearance may be changed according to the optical design. Similarly, while no clearance is left between the first light shield member and the second light shield member in the fourth embodiment under the full close condition of the light shield members 391a and 391b, the size of the clearance may be change according to the optical design.

While the arc tube 22a of the light source lamp unit 20 is constituted by a high-pressure mercury lamp in the embodiments, the arc tube 22a may be a metal halide lamp or the like.

While the polarization converting member 34 for converting light received from the light source lamp unit 20 and the like into polarized light having a particular direction is used in the embodiments, the disclosure is applicable to an illumination device not including the polarization converting member 34.

While the disclosure has been applied to the projector including the transmission type liquid crystal light valves 50a, 50b, and 50c in the embodiments, the disclosure is applicable to a projector including reflection type liquid crystal light valves. The "transmission type" herein refers to a type of liquid crystal light valve which transmits light, and the "reflection type" refers to a type of liquid crystal light valve which reflects light.

The structure of the projector shown in FIG. 1 and other figures is applicable to both a front projection type projector which projects images in the projection surface viewing direction and a rear projection type projector which projects images in the direction opposite to the projection surface viewing direction.

According to the embodiments, light modulation for the respective colors is performed by using the color separation and light guide system 40, the liquid crystal light valves 50a, 50b, and 50c and others. However, light modulation and combination of color images may be carried out by using a combination of a color wheel illuminated by an illumination device and a device (light modulation unit) constituted by pixels of micromirrors and receiving transmission light from the color wheel.

Therefore, it is manifestly intended that embodiments in accordance with the present disclosure be limited only by the claims and the equivalents thereof.

What is claimed is:

1. A projector comprising:
    an illumination system having a light source, a light shield unit that shields a portion of a light emitted from the light source, and a drive mechanism which drives the light shield unit; and
    a light modulation device illuminated by an illumination light received from the illumination system,
    wherein the light shield unit driven by the drive mechanism rotates around a predetermined rotation axis to change a size of a light shield area,
    the light shield unit having a leading edge defining a boundary between the light shield area and a non light shield area during the rotation,
    the leading edge having a contour defined by a plurality of first edges and a second edge disposed between the first edges, the second edge configured to be contoured toward the light source and projecting away from the first edges during rotation of the light shield unit,
    a reference plane contains a center axis of the light emitted from the light source and extends in parallel with the rotation axis, and a difference between a maximum distance from the first edges to the reference plane and a maximum distance from the second edge to the reference plane gradually and constantly decreases as the light shield area gradually increases by rotation of the light shield unit toward a fully closed condition, and
    when the light shield unit is in the fully closed condition, the maximum distance from the first edges to the reference plane and the maximum distance from the second edge to the reference plane become equivalent to each other.

2. The projector according to claim 1, wherein a shape of the leading edge as viewed in a direction from the center axis of the light emitted from the light source becomes linear as the light shield unit rotates to the maximum light shield condition.

3. The projector according to claim 1, wherein the light shield unit has a concave portion formed in a direction so as to protrude toward the light source, and the second edge corresponds to an edge of the concave portion.

4. The projector according to claim 3, wherein the light shield unit has a flat portion disposed on each side of the concave portion and extending in a direction away from the concave portion, and the first edges correspond to the edges of the flat portions.

5. The projector according to claim 1, wherein:
    the light shield unit has an end portion containing the leading edge and a main portion extending from the end portion toward the rotation axis;

the end portion being formed from a bended portion of the main portion and having a notch corresponding to the second edge.

6. The projector according to claim 1, wherein the light shield unit is formed by a continuous single material.

7. The projector according to claim 1, wherein the light shield unit is formed by press working of a single plate-shaped material.

8. The projector according to claim 1, wherein:
the reference plane contains a center axis of the light emitted from the light source and extends in parallel with the rotation axis,
a pair of the light shield units are disposed symmetric with respect to the reference plane with the reference plane interposed between the light shield units; and
the drive mechanism drives the pair of the light shield units in synchronization with each other.

9. The projector according to claim 1, wherein:
the illumination system has a pair of lens arrays which help equalize the light emitted from the light source; and
the light shield unit is disposed between the pair of lens arrays.

10. A projector comprising:
an illumination system having a light source, a light shield unit which shields a portion of a light emitted from the light source, and a drive mechanism which drives the light shield unit; and
a light modulation device illuminated by an illumination light received from the illumination system, wherein
the light shield unit driven by the drive mechanism rotates around a predetermined rotation axis to change a size of a light shield area,
when not in a maximum light shield condition, a shape of a first leading edge of the light shield unit, as viewed in a direction from a center axis of the light emitted from the light source, is concaved, and a shape of a second leading edge of the light shield unit, as viewed in the direction from the center axis of the light emitted from the light source, is convexed, and
when in a maximum light shield condition, a shape of the first leading edge, as viewed in the direction from the center axis of the light emitted from the light source, is linear, and a shape of the second leading edge, as viewed in the direction from the center axis of the light emitted from the light source, is linear.

11. A projector comprising:
an illumination system having a light source, a light shield unit which shields a portion of a light emitted from the light source, and a drive mechanism which drives the light shield unit; and
a light modulation device illuminated by an illumination light received from the illumination system, wherein
the light shield unit has a first light shield section driven by the drive mechanism and rotatable around a predetermined first rotation axis, and a second light shield section rotatable around a second rotation axis different from the first rotation axis,
the first light shield section having a first leading edge containing a first edge and a second edge,
the second light shield section having a second leading edge containing a third edge opposed to the first edge and a fourth edge opposed to the second edge, the first and second leading edges forming a boundary between a light shield area and a non light shield area during the rotation,
when not in a maximum light shield condition, a shape of the first leading edge and a shape of the second leading edge are such that when projected in a center axis direction of the light emitted from the light source, a first distance between the projected first edge and third edge is shorter than a second distance between the projected second edge and fourth edge, and
a difference between the first distance and the second distance varies in accordance with the rotation of the first light shield section and the second light shield section.

* * * * *